United States Patent
Paweletz et al.

(10) Patent No.: US 10,081,497 B2
(45) Date of Patent: Sep. 25, 2018

(54) SOLENOID-POWERED CONVEYING DEVICE

(71) Applicant: Robert Bosch GmbH, Stuttgart (DE)

(72) Inventors: Anton Paweletz, Fellbach (DE); Joachim Frangen, Heilbronn (DE); Heike Raatz, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/525,248

(22) PCT Filed: Oct. 26, 2015

(86) PCT No.: PCT/EP2015/074705
§ 371 (c)(1),
(2) Date: May 8, 2017

(87) PCT Pub. No.: WO2016/091444
PCT Pub. Date: Jun. 16, 2016

(65) Prior Publication Data
US 2017/0320682 A1    Nov. 9, 2017

(30) Foreign Application Priority Data

Dec. 9, 2014 (DE) .................. 10 2014 225 317

(51) Int. Cl.
 B65G 45/10    (2006.01)
 H02K 41/02   (2006.01)
 B65G 54/02    (2006.01)
(52) U.S. Cl.
 CPC ............. *B65G 45/10* (2013.01); *B65G 54/02* (2013.01); *H02K 41/02* (2013.01); *H02K 2201/03* (2013.01)

(58) Field of Classification Search
 CPC ................................ H02K 41/02; B65G 45/10
 USPC ........................................................ 198/494
 See application file for complete search history.

(56) References Cited

U.S. PATENT DOCUMENTS

| 5,093,590 A | 3/1992 | Murai et al. |
| 5,179,304 A * | 1/1993 | Kenjo ..................... H02K 5/10 |
| | | 310/12.18 |
| 5,842,094 A * | 11/1998 | Bruyndonckx .... G03G 15/0822 |
| | | 399/289 |

(Continued)

FOREIGN PATENT DOCUMENTS

| DE | 1 958 177 A1 | 5/1971 |
| DE | 296 20 915 U1 | 3/1998 |

(Continued)

OTHER PUBLICATIONS

International Search Report corresponding to PCT Application No. PCT/EP2015/074705, dated Jan. 27, 2016 (German and English language document) (7 pages).

*Primary Examiner* — Thomas Randazzo
(74) *Attorney, Agent, or Firm* — Maginot, Moore & Beck LLP

(57) ABSTRACT

An electromagnet-operated conveying device includes a movable conveying element, at least one permanent magnet, and a cleaning device. The at least one permanent magnet is arranged on the conveying element for the onward movement of the conveying element. The cleaning device is configured to remove particles from a surface of the at least one permanent magnet.

16 Claims, 3 Drawing Sheets

(56) References Cited

U.S. PATENT DOCUMENTS

| | | | | | |
|---|---|---|---|---|---|
| 5,909,066 | A | * | 6/1999 | Nanba | H02K 41/031 310/12.14 |
| 6,930,415 | B2 | * | 8/2005 | Hoppe | B23Q 5/28 310/12.01 |
| 2006/0264310 | A1 | * | 11/2006 | Phillips, III | B08B 1/02 493/101 |
| 2010/0058891 | A1 | * | 3/2010 | Hunter | C22B 7/005 75/10.67 |
| 2016/0107844 | A1 | * | 4/2016 | Lelie | B65G 45/22 198/495 |
| 2016/0190966 | A1 | * | 6/2016 | Kadynski | H02P 25/06 318/135 |

FOREIGN PATENT DOCUMENTS

| | | | | |
|---|---|---|---|---|
| JP | 06135324 A | * | 5/1994 | B65G 45/10 |
| JP | H 06-135324 A | | 5/1994 | |
| JP | H 10-323010 A | | 12/1998 | |
| JP | 2002-066867 A | | 3/2002 | |
| JP | 2004-336963 A | | 11/2004 | |
| WO | 2013/059934 A1 | | 5/2013 | |

* cited by examiner

SOLENOID-POWERED CONVEYING DEVICE

This application is a 35 U.S.C. § 371 National Stage Application of PCT/EP2015/074705, filed on Oct. 26, 2015, which claims the benefit of priority to Serial No. DE 10 2014 225 317.9, filed on Dec. 9, 2014 in Germany, the disclosures of which are incorporated herein by reference in their entirety.

The present disclosure relates to an electromagnet-operated conveying device which, in order to ensure trouble-free operation, comprises a cleaning device. The present disclosure also relates to a method for cleaning permanent magnets of such a conveying device.

BACKGROUND

Conveying devices which are magnet-operated or powered by magnets are known in an extremely wide range of configurations from the prior art. Thus, for example, DE 1958177 A1 describes a conveying device with a circulating, endlessly magnetizable conveyor belt and an endless driver chain which acts on the inside of said conveyor belt, is provided with permanent magnets and is driven by a drive device. On the upper side of the conveyor belt, suitable conveying elements which are magnetic, that is to say likewise provided with permanent magnets, are used to convey materials. The problem with all magnet-operated conveying devices is contamination of the permanent magnets. This primarily leads to local changes in the magnetic field. Depending on the level of contamination, it is additionally possible for mechanical faults to the conveying sequence and the conveying speed to occur.

SUMMARY

The electromagnet-operated conveying device according to the disclosure is, by contrast, distinguished by a steady conveying sequence with an always constant conveying speed. The conveying device according to the disclosure has a cleaning device for this purpose, by means of which, during the operation of the conveying device, particles can be removed from a surface of permanent magnets, which are arranged on the conveying elements for the onward movement of conveying elements (movers) of the conveying device. Whereas, on the other hand, it was previously necessary to interrupt the conveying operation in order to clean the magnets, it is now possible, according to the present disclosure, to eliminate contaminants without interrupting the conveying operation. This in-process cleaning saves costs and avoids production losses. For this purpose, the cleaning device, like the movable conveying elements, is an integral component of the conveying device and can be provided at any desired points. For completeness, it should be explained that the conveying device according to the disclosure can also have multiple conveying elements each having one or more permanent magnets.

Preferred developments of the disclosure are provided by additional features of the descriptions, drawings, and claims.

One advantageous development of the conveying device according to the disclosure provides that the coating device is fixed in its location and the permanent magnet can be led past the cleaning device during the onward movement of the conveying element. This makes it possible for the permanent magnet to be cleaned once during each circulation of the conveying element. This contributes to a fault-free and failure-free conveying sequence.

The cleaning action can be achieved by different effects. An advantageous refinement provides for the cleaning device to be a magnetic cleaning device and for the removal of the particles from the surface of the permanent magnet to be carried out by using magnetic force. The magnetic cleaning device is accordingly suitable in particular for eliminating magnetic particles.

According to an advantageous development, the cleaning device comprises a movable magnetic element for detaching the particles. Such a magnetic element can have any suitable shape and, for example, can be formed as a plate or rotationally symmetrical element. By means of moving the magnetic element in the direction of the permanent magnets to be cleaned, particles are attracted from the surface of the permanent magnet, induced by the magnetic attraction force of the magnetic element, are detached from the permanent magnets and attached to the magnetic element. By means of moving the magnetic element away from the cleaned permanent magnets, the particulate contaminants can be removed permanently.

Advantageously, the magnetic cleaning device comprises a first rotatable roller, wherein the first rotatable roller is magnetizable with a magnetic field strength which is higher than a magnetic field strength of the permanent magnet of the conveying element. By means of the generation of an appropriate magnetic field on the surface of the first roller, particles to be removed from the surface of the permanent magnet are transferred to the first roller without any mechanical action. As a result of rotation of the first roller, as yet uncontaminated surface faces the permanent magnets, so that the cleaning performance is very effective. In this case, the cleaning is carried out very gently and does not impair the surface nature of the permanent magnet even in the event of frequent cleaning.

To regenerate the cleaning performance of the first roller, the magnetic field applied to the first roller can be switched off. Initially, by means of magnetic interaction, particles adhering to the first roller are thus no longer attracted by the first roller and fall off the same. Particularly suitable in this case is switching off the magnetic field of the first roller at intervals, in particular also with rotation of the roller, so that the entire surface of the first roller is freed of adhering particles.

Control of the cleaning operation can advantageously be improved in that, in addition to the first rotatable roller, a second rotatable roller and a circulating belt enclosing the first roller and the second roller are provided. By means of applying a magnetic field to the first roller, particles from the surface of the permanent magnets are conveyed to the belt surrounding the first roller. By means of connecting the first roller to a second roller via the belt, the particles can be led away very quickly and efficiently from the first roller, so that the latter is made capable of detaching further particles.

Advantageously, the second roller is non-magnetizable. Particles held on the belt then fall unimpeded off the first roller outside the area of influence of the magnetic field. The belt is thus, so to speak, self-cleaning. Complicated control of the magnetization of the first roller or of the rotation of the first roller is therefore not necessary.

As an alternative to a magnetic cleaning device, a cleaning device having an adhesive force is possible. The cleaning device having an adhesive force removes particles from the surface of the permanent magnet by means of a high adhesive action or else by bonding the particles to the cleaning device, and is therefore not restricted to magnetic particles. The cleaning device with adhesive force can, for example, have adhesive structures following the principle of a chain or a gecko or else simply impart a certain tackiness and therefore finds versatile application in the cleaning of permanent magnets of the conveying elements of dirt particles such as dust, soot and the like, but also in the elimination of relatively large particles, such as can accumulate in product fabrication.

Advantageously, the cleaning device having an adhesive force comprises a first rotatable roller with a surface having an adhesive force. The first roller thus has adhesion-imparting surface regions to which the particles adhere. Depending on the particles to be removed, the adhesive force of the surface having an adhesive force can be set accordingly.

In order to achieve a good cleaning performance permanently, the conveying device advantageously comprises an application device for applying a surface layer having an adhesive force to the first roller. The surface layer can cover the entire surface of the first roller but can also be provided only partially.

As an alternative to a roller with a surface having an adhesive force or a surface layer having an adhesive force, the cleaning device can advantageously also comprise a first rotatable roller which has a film having an adhesive force on at least one surface section. The film with an adhesive force is not a fixed component of the first roller but is merely arranged on the surface of the first roller. As a result of its adhesion-promoting properties, particles can adhere to the film. If need be, the film can easily be removed from the first roller without any great technical outlay and a new film can be arranged on the roller.

Likewise advantageously, the cleaning device can comprise a first rotatable roller and a second rotatable roller and a circulating belt enclosing the first roller and the second roller and having an adhesive force. Control of the rotation of the first roller can thus be implemented very simply, and therefore cleaning performance can be controlled specifically.

By means of a vertical arrangement of the first roller and the second roller, i.e. the arrangement of the first roller above the second roller, removal of the particles out of the transport area of the conveying device is possible particularly rapidly and uncomplicatedly.

Advantageously, the conveying device comprises a control unit which is set up to switch the cleaning device on and off. Depending on the space which is available on the conveying device, the control unit can be provided on the cleaning device or else in the surroundings of the conveying device.

Further advantageously, a control unit is provided, which is set up to drive the first roller at a speed which corresponds to a speed of the permanent magnet led past the roller. In this way, the cleaning performance can be increased efficiently.

If the particles removed from the surface of the permanent magnet by the cleaning device do not fall off the cleaning device on their own, due to their gravity, a separating device is advantageously provided. By means of the separating device, the particles can be separated from the cleaning device. Depending on the configuration of the cleaning device, the separating device can also be constructed differently and, for example, comprise a scraping device, a brush, a blower, a pull-off device, for example for the removal of an adhesive film and the like.

In order to make it easier to dispose with particles eliminated from the permanent magnet and possibly even to feed the particles to recycling, the conveying device advantageously comprises a receiving apparatus for receiving the particles removed from the permanent magnet.

A further advantageous development provides for the conveying device to be constructed as a planar drive conveying device. Such planar drive conveying devices are described by way of example in WO 2013/059934 A1 and, in addition to a conveying element which comprises a permanent magnet, have an electromagnetic transport surface for the planar movement of the conveying element. According to the disclosure, the transport surface has at least one gap, in which the cleaning device is arranged. Thus, attraction and removal of particles from the surface of the permanent magnet to be cleaned are carried out exclusively in the gap. The conveying element or elements are therefore moved over the gap, wherein here separation and extraction of the particles is carried out locally by the cleaning device.

Likewise according to the disclosure, a method for cleaning permanent magnets of an electromagnet-operated conveying device is also described. The conveying device can be constructed as disclosed above and have a movable conveying element, at least one permanent magnet arranged on the conveying element for the onward moment of the conveying element, and a cleaning device for removing particles from a surface of the permanent magnet. The cleaning of the permanent magnet is carried out by means of the steps of leading the permanent magnet past the cleaning device and picking up the particles by means of the cleaning device. The method can be implemented simply without great technical outlay and permits cleaning of the permanent magnets during the conveying operation of the conveying device, so that the continuity of the conveying process is ensured and process-induced stoppages are avoided.

Advantageously, the method according to the disclosure comprises the step of removing the particles from the cleaning device in order to regenerate the cleaning action.

BRIEF DESCRIPTION OF THE DRAWINGS

Exemplary embodiments of the disclosure will be described in detail below with reference to the accompanying drawing, in which.

DETAILED DESCRIPTION

The disclosure will be explained in detail with reference to the following drawings. Here, identical designations number identical components.

Figure 1:
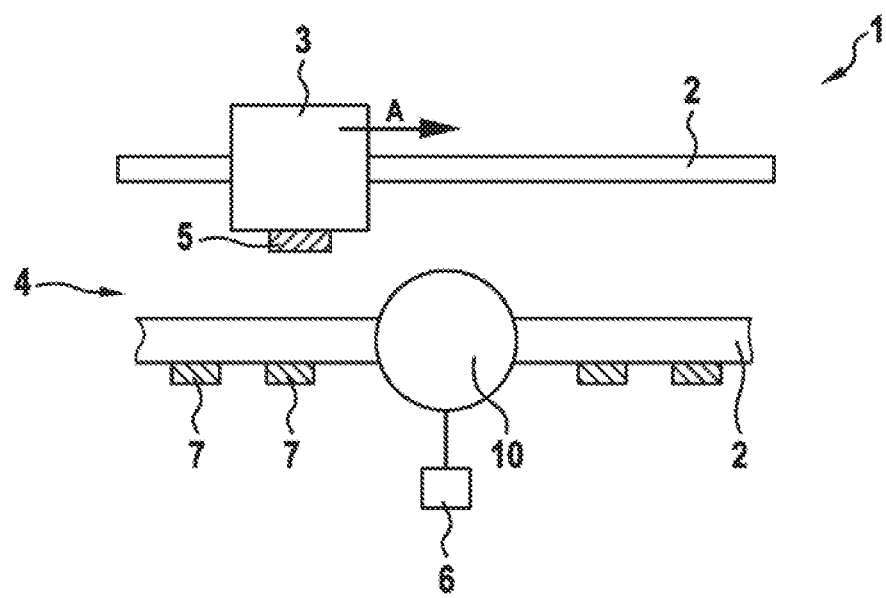
FIG. 1 shows a schematic illustration of an extract from a conveying device according to a first exemplary embodiment of the disclosure.

FIG. 1 shows, schematically, a side view of an extract from a conveying device 1 according to a first embodiment of the disclosure. The conveying device 1 comprises a linear drive 4 having guide rails 2 and conveying magnets 7, wherein the conveying magnets 7 interact with permanent magnets 5 which are arranged on conveying elements 3

(movers). The conveying device 1 according to the disclosure can comprise multiple conveying elements 3.

The conveying element 3 shown in FIG. 1 has a permanent magnet 5 on its underside but can also have multiple permanent magnets. During operation of the linear drive 4, by means of magnetic attraction forces or magnetic repulsion forces, the permanent magnet 5 of the conveying element 3 and therefore also the conveying element 3 itself are moved in the direction of the arrow A. Cargo which, for example, is supported on the conveying element 3, can thus be transported from one location to the other along the conveying direction of the conveying device 1.

The conveying device 1 also has a cleaning device 10, which is arranged in a fixed location on a portion of the distance of the linear drive 4. The cleaning device 10 is provided such that it is made capable of cleaning the permanent magnets 5 fixed to the underside of the conveying elements 3 as the permanent magnets 5 are led past the cleaning device 10, that is to say of removing particles adhering thereto.

The cleaning device 10 can be constructed as a magnetic cleaning device or as a cleaning device having an adhesive force. These have the same effect; specifically they effect elimination of particles adhering to the permanent magnets 5, but are different in function. A magnetic cleaning device draws the particles off the surface of the permanent magnets 5 by means of magnetic interaction, without expending mechanical work. A cleaning device having an adhesive force interacts with the particles in such a way that the particles are bonded to the cleaning device 10 by bonding or adhesion, as is produced, for example, by adhesive hairs.

The conveying device 1 also has a control unit 6, which is set up to switch the cleaning device 10 on and off. The control device 6 can also be arranged on the cleaning device 10.

As a result of the integration of the cleaning device 10 in the conveying device 1, during the operation of the conveying device 1 continuous cleaning of the permanent magnets 5 of the conveying elements 3 can be performed without stoppage times having to be provided. A conveying performance that is constantly good over time is achieved.

Figure 2:
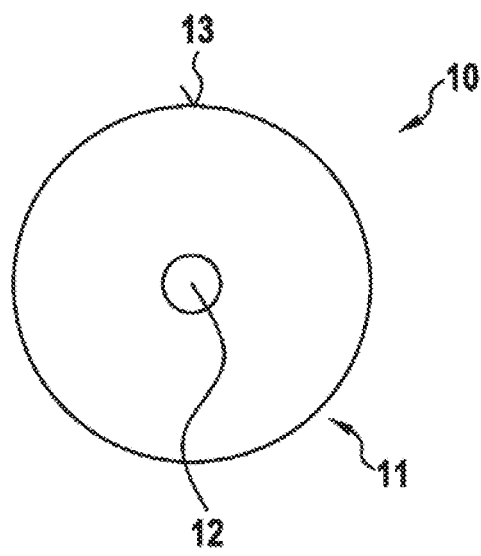
FIG. 2 shows a side view of a cleaning device according to a first exemplary embodiment of the disclosure.

FIG. 2 shows an extract from a first refinement of a cleaning device 10 according to the disclosure. Shown in detail is a first roller 11 which, for example, is formed from a magnetic material or a material having an adhesive force. The first roller 11 is rotatably mounted by means of a bearing 12. As the permanent magnet or permanent magnets are led past the first roller 11, particles are transferred to a surface 13 of the first roller 11 and adhere there either as a result of magnetic attraction forces or as a result of forces imparted by the adhesive force. In the case of a magnetic first roller 11, this is magnetizable with a magnetic field strength which is higher than a magnetic field strength of the permanent magnets of the conveying element.

The first roller 11 can rotate, so that, after picking up the particles, a particle-free surface 13 of the first roller 1 can be faced toward the permanent magnet and the cleaning performance is always constantly good.

By means of the control unit 6, as illustrated by way of example in FIG. 1, the first roller 11 can be driven at a speed which corresponds to a speed of the permanent magnet 5 led past the first roller 11.

Figure 3:
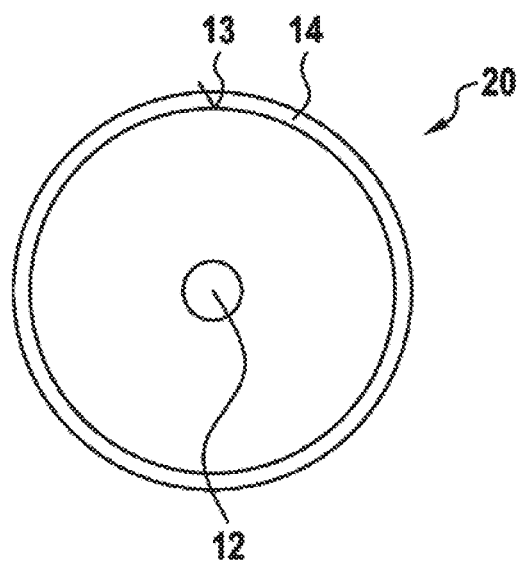
FIG. 3 shows a side view of a cleaning device according to a second exemplary embodiment of the disclosure.

The extract from a cleaning device 20 shown in FIG. 3 differs from the cleaning device 10 from FIG. 2 in that the first roller has on its surface a film 14 having an adhesive force. The film 14 having an adhesive force is arranged on at least one section of the surface 13 of the first rotatable roller 11 and, as shown here, advantageously covers the entire surface 13 of the first roller 11. As a result of the properties of the film 14 that impart adhesive force, as permanent magnets 5 are led past, adhering particles are transferred from the surface of the permanent magnets 5 to the film 14. Once the film 14 is covered with particles, they can be removed from the roller 11. In order to renew the cleaning performance, a new film can then be applied to the surface 13 of the first roller 11.

Figure 4:
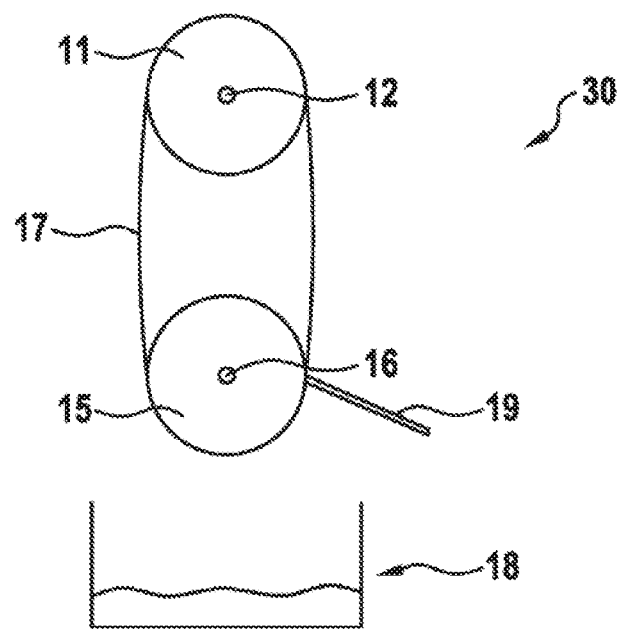
FIG. 4 shows a side view of a cleaning device according to a third exemplary embodiment of the disclosure.

FIG. 4 is a side view of an extract from a third cleaning device 30. Here, in addition to a first roller 1, a second roller 15 is provided, likewise rotatably mounted by means of a bearing 16. The first roller 1 and the second roller 15 are surrounded by a circulating belt 17 enclosing the rollers 11, 15. The first roller 11 and the second roller 15 are arranged vertically relative to each other, wherein the first roller 11 faces the permanent magnets 5 of the conveying elements 3.

As in the embodiments outlined above, there are also various operating modes of the cleaning device 30 here.

Firstly, the first roller 11 can be magnetizable, as outlined in a view of FIG. 2. The magnetic attraction forces act through the belt 17 on the permanent magnets afflicted with particles and led past the cleaning device 30 and here past the first roller 11. The particles are attracted more highly by the first roller 11 by the higher magnetic field strength of the first roller 11 as compared with the magnetic field strength of the permanent magnets of the conveying elements, and come to lie on the belt 17. As a result of rotation of the first roller 11, the belt 17 and the second roller 15 are also rotated. The section of the belt that is afflicted with particles is moved in the direction of the second roller 15. As soon as the magnetic attraction forces of the first roller 11 no longer act adequately on the particles, the latter fall off the belt 17.

The particles are preferably caught by a receiving apparatus 18. In order to assist the detachment of the particles from the belt 17, a separating device 19 can be provided.

In a further embodiment, the belt 17 is a belt having an adhesive force, for example an adhesive belt. Here, too, the permanent magnets led past the belt 17 are freed of particles in that the particles are specifically transferred by means of adhesive interaction with the belt 17. The particles then fall off either in accordance with the laws of gravity as a result of their inherent weight or can be removed from the belt 17 by the separating device 19, for example a knife or the like, so that the cleaning action of the cleaning device 30 is always constantly good.

Figure 5:
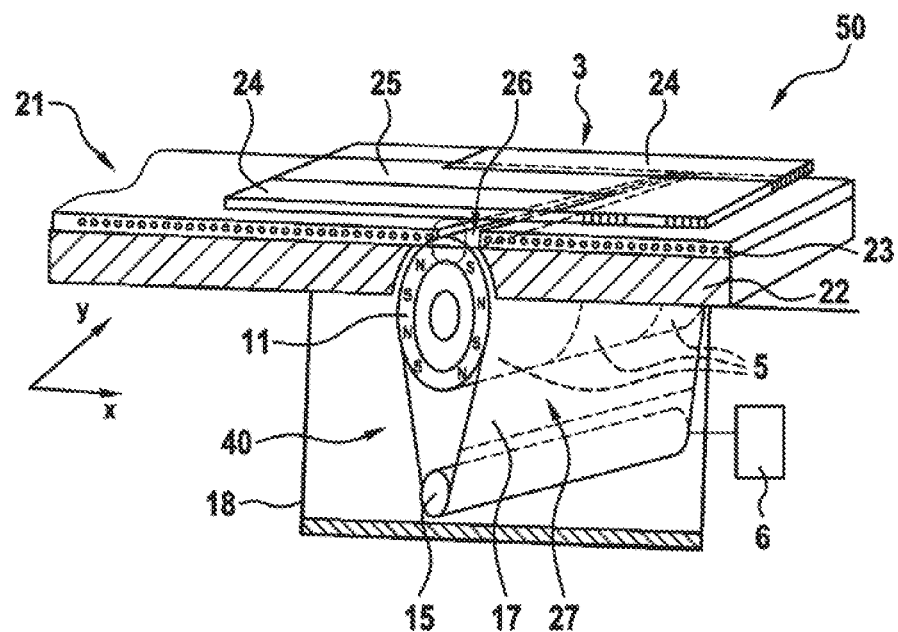
FIG. 5 shows a schematic illustration of an extract from a conveying device according to a second exemplary embodiment of the disclosure.

FIG. 5 is a schematic illustration of an extract from a conveying device according to a second exemplary embodiment of the disclosure. In detail, FIG. 5 shows a planar drive conveying device 50, which comprises an electromagnetic transport surface 21 for the planar movement of a conveying element 3. The electromagnetic transport surface 21 has a stator 22 and a sensor layer including winding layer, active braking layer and power electronics. Arranged on the transport surface 21, by way of example, is a conveying element 3 having two permanent magnets 24, a so-called Halbach magnet arrangement, for moving the conveying element 3 in the X direction. Also shown is one of two permanent magnets 25, likewise a Halbach magnet arrangement, for moving the conveying element 3 in the Y direction. Provided in the transport surface 21 is a gap 26, in which there is arranged a cleaning device 40.

The cleaning device 40 comprises a first roller 11 and a second roller 15, which are connected to each other by a belt 17. The second roller 15 is used as a drive roller for the belt 17 and is controlled by the control unit 6. The first roller 11 is magnetizable, preferably over $2/3$ of its length, specifically respectively over ⅓ of the length of the roller 1 at each end. As a result of rotation of the second roller 15, rotation of the first roller 11 is produced by the belt 17. As a result of the specific pattern of the magnetic field in the working gap between the underside of the conveying element 3 and the transport surface 21, for example, ferromagnetic particles accumulate on the underside of the permanent magnets 24, 25. By means of the alternating magnetic polarization, particles from the conveying element 3 moved over the gap 26 are deflected by the stronger magnetic field of the first roller 11, are detached from the permanent magnets 24, 25, drawn off and conveyed onto the belt 17. The particles adhere to the surface of the belt 17 as a result of magnetic attraction of the first roller 11. As a result of further rotation of the second roller 15 and therefore also of the first roller 11, the particles finally reach a region 27 of the belt 17 outside the area of influence of the magnetic field of the first roller 11 and fall from the belt 17 into the receiving apparatus 18.

By means of the specifically constructed conveying device 50 of this embodiment, attraction, detachment and removal of particles from the surface of the permanent magnets 24, 25 to be cleaned take place exclusively in the gap 26. The permanent magnets 24, 25 of the conveying element 3 are cleaned during movement over the gap 26.

Figure 6:
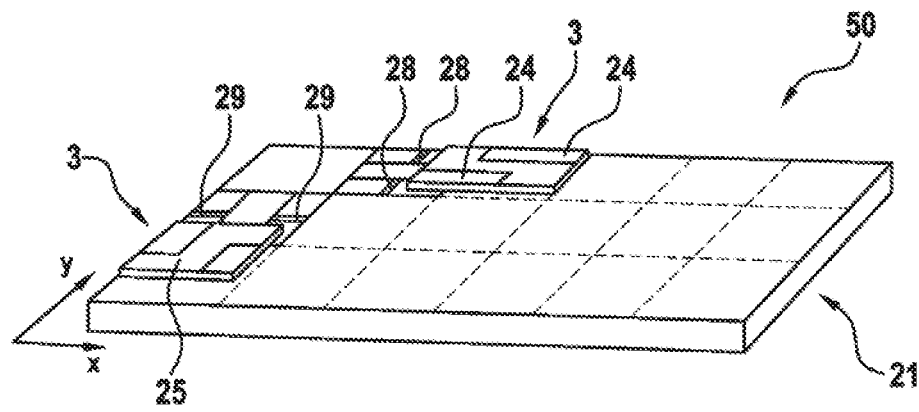
FIG. 6 shows a further schematic illustration of the conveying device according to a second exemplary embodiment of the disclosure.

FIG. 6 is a further schematic illustration of the electromagnetic conveying device from FIG. 5. Here, the entire transport surface 21 is shown. Two conveying elements 3 are arranged on the transport surface 21. The transport surface 21 has a total of four gaps 28, 29. Gaps 28 are those which permit cleaning of the permanent magnet or magnets 24 in the X direction, while gaps 29 are those which permit cleaning of the permanent magnet 25 (or the permanent magnets 25) in the Y direction. Cleaning devices 40 are respectively arranged in the gaps 28, 29. Between the gaps 28 and 29 arranged in pairs there are sections of the transport surface 21, so that no cleaning of the permanent magnets 24, 25 is effected in these areas.

The invention claimed is:

1. An electromagnet-operated conveying device comprising:
    a movable conveying element;
    at least one permanent magnet arranged on the conveying element for onward movement of the conveying element; and
    a cleaning device configured to remove particles from a surface of the at least one permanent magnet, wherein
    the cleaning device includes a first rotatable roller;
    the first rotatable roller is magnetizable with a magnetic field strength that is higher than a magnetic field strength of the at least one permanent magnet;
    the cleaning device further includes a second rotatable roller and a circulating belt; and
    the circulating belt encloses the first rotatable roller and the second rotatable roller.

2. The conveying device as claimed in claim 1, wherein:
    the cleaning device is disposed at a fixed location; and
    the at least one permanent magnet is configured to be led past the cleaning device during the onward movement of the conveying element.

3. The conveying device as claimed in claim 1, further comprising:
    a control unit configured to drive the first rotatable roller at a roller speed,
    wherein the at least one permanent magnet is configured to be led past the first rotatable roller at a magnet speed, and
    wherein the roller speed corresponds to the magnet speed.

4. The conveying device as claimed in claim 1, wherein the first rotatable roller and the second rotatable roller are vertically arranged.

5. The conveying device as claimed in claim 4, further comprising a separating device configured to separate the particles removed from the surface of the at least one permanent magnet by the cleaning device.

6. The conveying device as claimed in claim 4, further comprising a receiving apparatus configured to receive the particles removed from the surface of the at least one permanent magnet.

7. An electromagnet-operated conveying device, comprising:
    a movable conveying element;
    at least one permanent magnet arranged on the conveying element for onward movement of the conveying element; and
    a cleaning device configured to remove particles from a surface of the at least one permanent magnet, wherein:
    the cleaning device is a cleaning device having an adhesive force;
    the cleaning device includes a first rotatable roller, a second rotatable roller, and a circulating belt; and
    the circulating belt encloses the first rotatable roller and the second rotatable roller and has the adhesive force.

8. The conveying device as claimed in claim 7, wherein:
    the conveying device is a planar drive conveying device that includes an electromagnetic transport surface configured for planar movement of the conveying element;
    the electromagnetic transport surface has a gap; and
    the cleaning device is arranged in the gap.

9. The conveying device as claimed in claim 7, wherein the first rotatable roller and the second rotatable roller are vertically arranged.

10. The conveying device as claimed in claim 7, further comprising:
    a control unit configured to drive the first rotatable roller at a roller speed,
    wherein the permanent magnet is configured to be led past the first roller at a magnet speed, and
    wherein the roller speed corresponds to the magnet speed.

11. The conveying device as claimed in claim 7, wherein:
    the cleaning device is disposed at a fixed location; and
    the at least one permanent magnet is configured to be led past the cleaning device during the onward movement of the conveying element.

12. A method for cleaning at least one permanent magnet of an electromagnet-operated conveying device the at least one permanent magnet arranged on the conveying element for the onward movement of the conveying element, comprising:
    leading the at least one permanent magnet past a cleaning device configured to remove particles from a surface of the at least one permanent magnet;
    rotating a circulating belt of the cleaning device, the circulating belt enclosing a first roller and a second roller; and
    picking up the particles with the cleaning device onto the circulating belt.

13. The method as claimed in claim 12, further comprising removing the particles from the cleaning device.

14. The conveying device as claimed in claim 12, wherein the first rotatable roller and the second rotatable roller are vertically arranged.

15. The method as claimed in claim 12, wherein picking up the particles with the cleaning device onto the circulating belt comprises:
   magnetically picking up the particles with the cleaning device onto the circulating belt.

16. The method as claimed in claim 12, wherein picking up the particles with the cleaning device onto the circulating belt comprises:
   adhesively picking up the particles with the cleaning device onto the circulating belt.

* * * * *